United States Patent
Harada et al.

(10) Patent No.: US 7,521,500 B2
(45) Date of Patent: Apr. 21, 2009

(54) SLIDING PARTS

(75) Inventors: Mikio Harada, Nishikamo-gun (JP); Yasuo Imatomi, Nishikamo-gun (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 690 days.

(21) Appl. No.: 11/283,725

(22) Filed: Nov. 22, 2005

(65) Prior Publication Data

US 2006/0111500 A1 May 25, 2006

(30) Foreign Application Priority Data

Nov. 24, 2004 (JP) ............................. 2004-338986

(51) Int. Cl.
*C08K 3/34* (2006.01)

(52) U.S. Cl. ...................... 524/456; 524/436; 524/442

(58) Field of Classification Search ................ 524/436, 524/442, 456
See application file for complete search history.

(56) References Cited

U.S. PATENT DOCUMENTS 5,504,139 A * 4/1996 Davies et al. ............... 524/504
5,583,177 A 12/1996 Kinoshita et al.
6,113,832 A 9/2000 Tanaka et al.

FOREIGN PATENT DOCUMENTS

| JP | 5-65328 | 9/1993 |
| --- | --- | --- |
| JP | 7-101246 | 4/1995 |
| JP | 7-266887 | 10/1995 |
| JP | 11-012459 | 1/1999 |
| JP | 3417600 | 4/2003 |

* cited by examiner

*Primary Examiner*—Edward J Cain
(74) *Attorney, Agent, or Firm*—Buchanan Ingersoll & Rooney PC

(57) ABSTRACT

A polyamide resin composition contains: 85 to 95 parts by weight of a polyamide resin; 5 to 15 parts by weight of a wollastonite; 3 to 10 parts by weight, to 100 parts by the total weight of the polyamide resin and the wollastonite, of a styrene copolymer modified with at least one modifier of unsaturated carboxylic acids and unsaturated dicarboxylic anhydrides; and 0.5 to 5 parts by weight, to 100 parts by the total weight of the polyamide resin and the wollastonite, of a high-density polyethylene modified with at least one modifier of the unsaturated carboxylic acids and the unsaturated dicarboxylic anhydrides, and the polyamide resin containing ingredients: 10 to 50 parts by weight of nylon 6 and 50 to 90 parts by weight of nylon 66, based on 100 parts by weight of the whole polyamide resin.

4 Claims, 3 Drawing Sheets

SLIDING PARTS

CROSS REFERENCE TO RELATED APPLICATIONS

This application is based on and claims priority under 35 U.S.C. §119 with respect to Japanese Patent Application 2004-338986, filed on Nov. 24, 2004, the entire content of which is incorporated herein by reference.

FIELD OF THE INVENTION

This invention generally relates to a sliding part made from a polyamide resin composition which has excellent friction proof and impact strength.

BACKGROUND

In general, polyamide resins such as nylons have excellent mechanical characteristics and excellent abrasion resistance. Therefore, they have been widely used for sliding parts such as a door-checking lever for an automobile, gears, and cam bearings. Plastic materials employed for this kind of application are usually required to meet conditions in terms of abrasion proof, impact strength for example. However, conventional polyamide resins exhibit the above characteristics only to an unsatisfactory extent. For this reason, commercially available polyamide resin compositions usually contain various kinds of additives such as wollastonites; elastomers; modified high-density polyethylenes; and Kevlar fibers, as disclosed in Japanese Patent No. 3417600 (corresponding to U.S. Pat. No. 5,583,177A) and Japanese Application Publication No. 05(1993)-65328 (corresponding to U.S. Pat. No. 6,113,832A).

A polyamide resin composition, which is disclosed in Japanese Patent No. 3417600, contains: (A) 85 to 95 parts by weight of a polyamide resin; (B) 5 to 15 parts by weight of a wollastonite; (C) 3 to 10 parts by weight, to 100 parts by the total weight of ingredients (A) and (B), of a styrene copolymer modified with at least one modifier selected from a group consisting of unsaturated carboxylic acids and/or unsaturated dicarboxylic anhydrides; and (D) 0.5 to 5 parts by weight, to 100 parts by the total weight of ingredients (A) and (B), of a high-density polyethylene modified with at least one modifier selected from the group consisting of unsaturated carboxylic acids and unsaturated dicarboxylic anhydrides, the high-density polyethylene having a weight average molecular weight of 50,000 to 400,000. A polyamide resin composition, which is disclosed in Japanese Publication No. 05(1993)-65328, contains an additive such as Kevlar fibers to nylon.

However, sliding parts, which is made from a conventional polyamide resin composition such as above, on occasions exhibits, at a high moisture atmosphere, an increased distortion amount of materials consisting the polyamide resin composition. When this type of polyamide resin composition is employed for a door-checking lever for an automobile, such distortion of materials consisting the polyamide resin composition may on occasions result in increasing a degree of operation force required for opening and closing a door. In such circumstances, the door-checking lever for an automobile may not meet a desired level of functions. Further, sliding parts, which are made from a conventional polyamide resin composition containing, therein, Kevlar fibers that generally cost high, are likely to be required to reduce manufacturing costs.

The present invention has been made in view of the above circumstances, and provides sliding parts employing a polyamide resin composition which is capable of providing excellent friction proof, excellent impact strength, excellent form stability against moisture absorption or at a high humid temperature, and is capable of reducing a manufacturing cost thereof.

SUMMARY OF THE INVENTION

According to an aspect of the present invention, a sliding part uses a polyamide resin composition at at least a sliding surface. The polyamide resin composition contains: 85 to 95 parts by weight of a polyamide resin; 5 to 15 parts by weight of a wollastonite; 3 to 10 parts by weight, to 100 parts by the total weight of the polyamide resin and the wollastonite, of a styrene copolymer modified with at least one modifier selected from a group consisting of unsaturated carboxylic acids and unsaturated dicarboxylic anhydrides; and 0.5 to 5 parts by weight, to 100 parts by the total weight of the polyamide resin and the wollastonite, of a high-density polyethylene modified with at least one modifier selected from the group consisting of the unsaturated carboxylic acids and the unsaturated dicarboxylic anhydrides, the high-density polyethylene having a weight-average molecular weight of 50,000 to 400,000. The polyamide resin contains ingredients: 10 to 50 parts by weight of nylon 6 and 50 to 90 parts by weight of nylon 66, based on 100 parts by weight of the whole polyamide resin.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
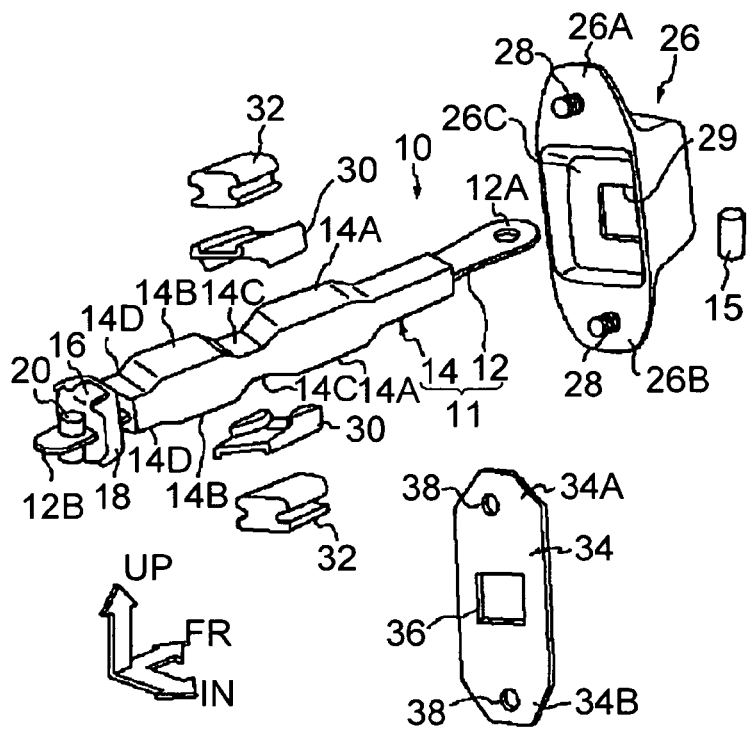
FIG. 1 is an exploded perspective view illustrating a structure of a door-checking apparatus including a door-checking lever using a polyamide resin composition according to an embodiment of the present invention.

An embodiment of the present invention will be described hereinbelow in detail with reference to the accompanying drawings.

A polyamide resin composition according to the embodiment of the present invention contains, to 100 parts by the total weight of ingredients: 85 to 95 parts by weight of a polyamide resin; and 5 to 15 parts by weight of a wollastonite, 3 to 10 parts by weight of a modified styrene copolymer and 0.5 to 5 parts by weight of a modified high-density polyethylene.

When the total amount of the polyamide resin is 100 parts by weight, any conventional polyamide resin can be used in combination of which is 10 to 50 parts by weight of nylon 6 and 50 to 90 parts by weight of nylon 66. Such combination contributes to form stability (operability) when absorbing moisture or at a high humid atmosphere. On the other hand, when the polyamide contains less than 10 parts by weight of nylon 6, in other words, when the polyamide resin contains more than 90 parts by weight of nylon 66, the polyamide resin cannot exhibit an adequate degree of friction proof and an adequate degree of impact strength. On the other hand, when the polyamide resin contains more than 50 parts by weight of nylon 6, in other words, when the polyamide resin contains less than 50 parts by weight of nylon 66, the polyamide resin cannot exhibit an adequate degree of form stability against moisture absorption or at a high humid atmosphere. A preferable percent, at which nylon 6 and nylon 66 are used for the polyamide resin, is 10 to 40 parts by weight of nylon 6 and 60 to 90 parts by weight of nylon 66, more preferably 10 to 30 parts by weight of nylon 6 and 70 to 90 parts by weight of nylon 66. As nylon 6 and nylon 66, nylon 6 and nylon 66, which both are Toyo Rayon Co, can be applicable as non-limiting examples.

The wollastonite used according to the embodiment of the present invention is an inorganic filler, and it can be selected from various commercial sources. The amount of wollastonite to be used is usually in the range of 5 to 15 parts by weight, so that the ingredients of the wollastonite at the aforementioned amount and the above described polyamide resin consists 100 parts by the total weight. At amounts of less than 5 parts by weight, the resulting molded parts have unsatisfactory mechanical properties and thermal properties. On the other hand, at amounts of greater than 15 parts by weight, it is difficult to obtain molded parts having a good surface and the resulting molded parts may have a deteriorated resistance to abrasion. For the reasons above, the amount of wollastonite can be 7 to 13 parts by weight, preferably 8 to 12 parts by weight.

The modified styrene copolymer has been modified with at least one modifier selected from the group consisting of unsaturated carboxylic acids and unsaturated dicarboxylic anhydrides. These ingredients make a contribution to improvements in the frictional characteristics and limit of fatigue.

The styrene copolymer used according to the embodiment of the present invention may be any conventional styrene block copolymer of the S(styrene)-B(butadiene)-S(styrene) type, having a symmetric block structure, wherein the letters S and B refer to an end polymer block and a center polymer block, respectively. The center block B is preferably composed of polybutadiene, although it may be replaced by polyisoprene. Also recommended are hydrogenated polystyrene-block-polybutadiene-block-polystyrene copolymers (SEBS) in which some double-bond portions of polybutadiene are changed into saturated alkyl groups (i.e., ethylene chains) by hydrogenation. The end block S refers to a polymer block of aromatic hydrocarbons, and is preferably composed of polystyrene. The molecular weight of the end block S can be usually in the range of 4000 to 115,000, preferably 5000 to 15,000. The molecular weight of the center block B can be usually in the range of 20,000 to 450,000, preferably 25,000 to 100,000. The hydrogenated styrene block copolymers can readily be obtained from various commercial sources; for example, they are commercially available under the trade names and grade names such as "Kraton G1650", "Kraton G1651" and "Kraton G1657" from Shell Chemical Co. The modified styrene copolymer is compounded in the rage of 3 to 10 parts by weight based on 100 pats by the total weight of the ingredients: the polyamide resin and the wollastonite. At the amounts less than 3 parts by weight, no improvement in the repeated fatigue characteristics can be attained. At the amounts more than 10 parts by weight, the abrasion loss due to the surface roughness is increased.

The modified high-density polyethylene has been modified with at least one modifier selected from the group consisting of unsaturated carboxylic acids and unsaturated dicarboxylic anhydrides. These ingredients make a contribution to improvements in the frictional characteristics and limit of fatigue.

The high-density polyethylene before modification refers to a high-density polyethylene having a molecular weight of 50,000 to 400,000 and a density of 0.94 kg/cm$^2$ or higher. The modified high-density polyethylene has a weight-average molecular weight of 50,000 to 400,000. Molecular weights less than 50,000 are not preferred because the resulting molded parts have an insufficient resistance to abrasion. Molecular weights greater than 400,000 are also not preferred because the production of molded parts becomes difficult. The high-density polyethylene used according to the embodiment of the present invention may contain at least one additional copolymerizable monomers, within the limits of not deteriorating the properties thereof, examples of which are α-olefins such as propylene, 1-butene, pentene, 4-methyl-1-pentene, hexene, octene and decene; dienes such as butadiene and isoprene; cycloolefins such as cyclopentene, cyclohexene and cyclopentadiene; and acrylates such as methyl acrylate, ethyl acrylate and butyl acrylate.

The modified high-density polyethylene is compounded in the range of 0.5 to 5 parts by weight based on 100 parts by the total weight of the ingredients: the polyamide resin and the wollastonite. At the amounts less than 0.5 parts by weight, the resulting molded parts have an insufficient resistance to abrasion. At the amounts greater than 5 parts by weight, the resulting molded parts exhibit a deterioration of mechanical properties such as stiffness and a degrease in the heat resistance. As the modified high-density polyethylene, Hi-Zex from Mitsui Oil CO., LTD can be applicable as a non-limiting example.

The styrene copolymer and high-density polyethylene can be modified with at least one modifier selected from the group consisting of unsaturated carboxylic acids, such as acrylic acid, methacrylic acid, crotonic acid and oleic acid, and unsaturated dicarboxylic anhydrides, such as maleic anhydride, itaconic anhydride and citraconic anhydride. These modifiers may be used alone or in combination. Particularly preferred is maleic anhydride.

The modification of a styrene copolymer or high-density polyethylene with an unsaturated carboxylic acid or unsaturated dicarboxylic anhydride can be effected by mixing the styrene copolymer or high-density polyethylene and the unsaturated carboxylic acid and/or unsaturated dicarboxylic anhydride in the presence of a peroxide for radical formation, and then kneading this mixture in an extruder or a mixer at 100° C. to 250° C. for 1 to 10 minutes. The amount of unsaturated carboxylic acid and/or unsaturated dicarboxylic anhydride to be used is preferably in the range of 0.1 to 5 parts by weight, based on the weight of the styrene copolymer or high-density polyethylene.

For the purpose of further improving sliding characteristics (i.e., frictional and abrasional characteristics) of molded parts as sliding parts, the polyamide resin composition according to the embodiment of the present invention may contain, in addition to the above four ingredients (the polyamide resin, and the wollastonite, the modified styrene copolymer, the modified high-density polyethylene), within the limits of not increasing the manufacturing cost, various additives such as carbon fibers, powdered fluorocarbon resins, molybdenum disulfide and glass beads. For the purpose of improving the mechanical and electrical properties of the sliding parts, the polyamide resin composition according to the embodiment of the present invention may contain, within the limits of not deteriorating the sliding characteristics of the resin molded parts, ordinary fillers such as calcium carbonate and barium sulfate; and electrical conductivity-improving fillers such as whiskers of potassium titanate, carbon black and metal powders. Further, the polyamide resin composition according to the embodiment of the present invention may contain additional additives such as inhibitors against any deterioration by oxygen, heat, ultraviolet ray or the like, stabilizers, lubricants, plasticizers, flame-retardants, antistatic agents, colorants and mold release agents, within the limits of not deteriorating the sliding characteristics of the resin molded parts.

The polyamide resin composition according to the embodiment of the present invention can be prepared by kneading the above ingredients together in an apparatus such as a single-screw extruder, twin-screw extruder, kneader or double roller. The kinds of kneading apparatus and kneading conditions to be employed are not particularly limited.

The polyamide resin composition obtained as described above is molded as a sliding part by use of an injection molding apparatus. Regarding the sliding part as the resulting molded part, the polyamide resin composition can be used at least to a sliding surface, or to the whole of the sliding part. Alternatively or in addition, the polyamide resin composition can be used for the purpose of coating the whole, or a part, of an inserted member such as an iron. A door checking lever for an automobile, gear, cam bearing and so on can represent the sliding part, as non-limiting examples.

EXAMPLES 1

The present invention will be further illustrated by way of the following examples, which are not to be construed to limit the scope thereof.

As is illustrated in FIG. 1, a check lever 11 of a door-checking apparatus 10 includes an insert 12, which is of long plate shaped and is made of metal, and a sliding portion 14, which is integrally formed with the insert 12 at a longitudinally middle portion of the insert 12. The sliding portion 14 is made of the polyamide resin composition according to the embodiment of the present invention. An end 12A of the insert 12 is pivotably supported, via a pin 15, at a pillar (not illustrated) of a vehicle, while the other end 12B penetrates a metal-made bracket 16 and a rubber 18 fixedly attached to the bracket 16. A pin 20 is provided at a tip end of the insert 12 which is opposite to the rubber 18 relative to the bracket 16. This pin 20 is employed for preventing drops of the insert 12 from the bracket 16 or the rubber 18.

The sliding portion 14 of the check lever 11 includes two thick-walled convex portions 14A and 14B along a longitudinal direction from the end 12A of the insert 12. A first thin-walled concave portion 14C is formed between the convex portions 14A and 14B. A second thin-walled concave portion 14D is formed at the side of the rubber 18 of the convex portion 14B. This configuration of the sliding portion 14 makes a contribution to restraining or controlling a door-opening angle to a certain extent. On the other hand, a case 26 is fixed to an inner panel (not illustrated) of a vehicle by means of weld bolts 28, which are welded to an upper flange 26A and a lower flange 26B, and nuts (not illustrated).

A central portion of the case 26 in an up and down direction in FIG. 1 acts as a housing portion 26C of which shape can be an approximately rectangular. A through hole 29, of which shape can be an approximately rectangular, is formed at a center of a bottom of the housing portion 26C, a through hole 29 into which the check lever 11 is operatively inserted. In the housing portion 26C, there are pads 30 as a pair of sliding members, which interposes or sandwiches the sliding portion 14 of the check lever 11 therebetween, and rubber dampers 32 as a pair of biasing means, which bias the pads 30 in directions opposing to each other. The pair of pads 30 is pushed towards the sliding portion 14 of the check lever 11 by the biasing forces of the corresponding rubber dampers 32, respectively.

The housing portion 26C of the case 26 is closed by a case cover 34, so that the pads 30 and the rubber dampers 32 are not dropped or protruded therefrom. A through hole 36, of which shape can be an approximately rectangular, is formed at a portion facing the through hole 29, a through hole 36 into which the check lever 11 is operatively inserted. At, or in the vicinity of an upper end portion 34A and a lower end portion 34B, through holes 38 are formed, through holes 38 into which the weld bolts 28 are inserted.

Figure 2:
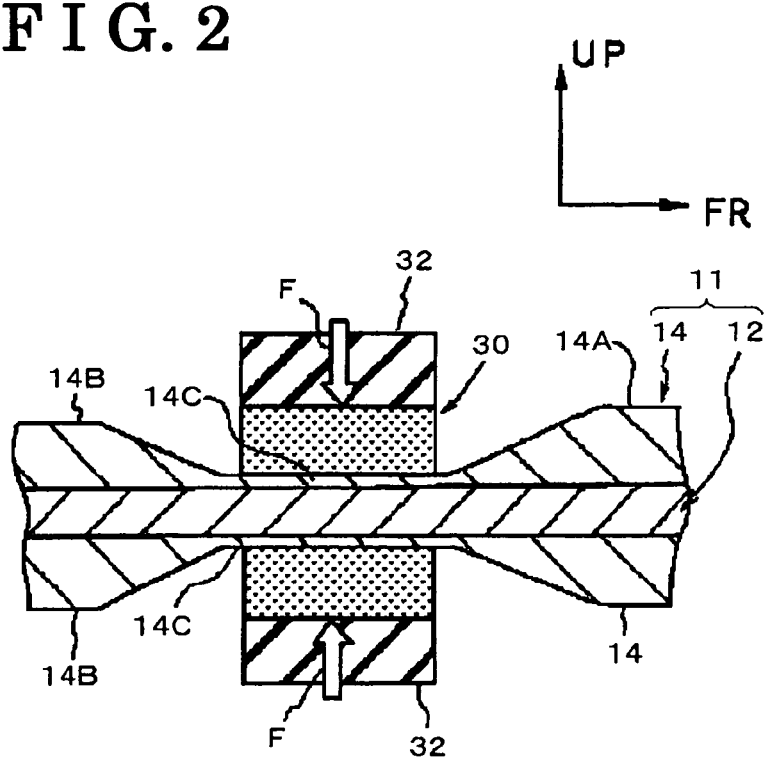
FIG. 2 is a partial cross sectional view schematically illustrating a relevant portion of the door-checking apparatus illustrated in FIG. 1.

As is illustrated in FIG. 2, the pads 30 are made of a polyacetal resin containing high polymers, which contribute for improvements in lubricity.

Figure 3:
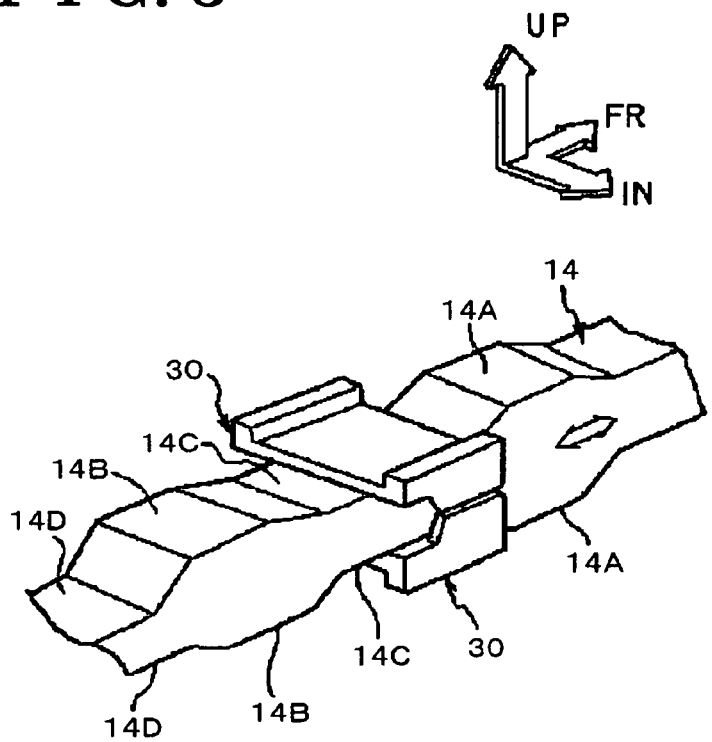
FIG. 3 an exploded perspective view illustrating the relevant portion of the door-checking apparatus illustrated in FIG. 2.

Next, described below is an operation according to the embodiment of the present invention. As is illustrated in FIGS. 2 and 3, in the door-checking apparatus 10, the sliding portion 14 of the check lever 11 slidably contacts with the pads 30 in response to opening and closing operations of a door. Here, the pair of pads 30 has been pushed towards the sliding portion 14 by the biasing forces of the pair of rubber dampers 32 (in a direction of arrow F in FIG. 2). Therefore, in the course that the sliding portion 14 of the check lever 11 slidably contacts with the pads 30, the high polymers having lubricity configuring the pads 30 permeates or leak up, as a lubricant, at sliding surfaces between the sliding portion 14 and the pads 30.

Next, described below are characteristics of the check lever made from the polyamide resin compositions according to the examples of the present invention, with reference to comparative examples.

Various kinds of polyamide resin compositions, in which the ingredients are mixed together in the respective designated amounts shown in Table 1, are employed for producing the check lever (see the reference numeral 11 in FIG. 1). Table 2 summarizes the resistance to abrasion, a degree of operation force when absorbing moisture or at a high humid atmosphere, and impact strength, of each polyamide resin composition associated with the sliding member (see the reference numeral 14 in FIG. 1) of the check lever.

TABLE 1

|  | Nylon 6 (parts by weight) | Nylon 66 (parts by weight) | Wollastonite etc. | Kevlar fiber |
|---|---|---|---|---|
| Example 1 | 10 | 90 | Included | Not included |
| Example 2 | 20 | 80 | Included | Not included |
| Example 3 | 50 | 50 | Included | Not included |
| Comparative Example 1 | 0 | 100 | Included | Not included |
| Comparative Example 2 | 100 | 0 | Included | Not included |
| Comparative Example 3 | 0 | 100 | Not included | 15 parts by weight |

TABLE 2

| | Abrasion proof | Operation force against moisture absorption | Impact strength | Cost | Total evaluation |
|---|---|---|---|---|---|
| Example 1 | ○(−25%) | ○(8 N · m) | ○(none) | ○(35) | ○ |
| Example 2 | ○(−25%) | ○(8 N · m) | ○(none) | ○(35) | ○ |
| Example 3 | ○(−25%) | ○(10 N · m) | ○(none) | ○(35) | ○ |
| Comparative Example 1 | X(−35%) | ○(8 N · m) | X (deteriorated) | ○(35) | X |
| Comparative Example 2 | ○(−25%) | X(12 N · m) | ○(none) | ○(35) | X |
| Comparative Example 3 | ○(−25%) | ○(8 N · m) | ○(none) | X(100) | X |

The fields for "Nylon 6" and "Nylon 66" in Table 1 explain the amounts thereof in 100 parts by the total weight of each polyamide resin, which is consisted of alone with one of "Nylon 6" and "Nylon 66" or is consisted of a combination thereof. The field for "Wollastonite etc." explains the presence or absence of the wollastonite, the modified styrene copolymer, and the modified high-density polyethylene. When "wollastonite etc." is included in each polyamide resin composition according to each example, (a) the wollastonite is contained at 10 parts by weight out of 100 parts by weight of the polyamide resin and the wollastonite; (b) the modified styrene copolymer is contained at 5 parts by weight based on 100 parts by the weight of the polyamide resin and the wollastonite; and (c) the modified high-density polyethylene is contained at 2.5 parts by weight based on 100 parts by the weight of the polyamide resin and the wollastonite. When "wollastonite etc." is not included in each polyamide resin composition according to each example, none of the wollastonite, the modified styrene copolymer and the modified high-density polyethylene is contained therein.

The ingredients were mixed together in the respective designated amounts shown in Table 1 to form pellets of the polyamide resin compositions. These pellets are molded in to a test piece of the check lever with the following conditions:
 a 100 ton thermoplastic type ignition molding machine was used;
 temperature of the cylinder: 270° C. to 300° C.;
 temperature of the metal mold: 70° C. to 90° C.;
 injection pressure: 30 Mpa to 60 Mpa;
 injection time: 15 seconds;
 cooling time: 15 seconds;
 insert: a metal insert of 1.6 mm-thick.

(Abrasion Proof Test)

The produced check lever (see the reference numeral 11 in FIG. 1) is mounted on the door-checking apparatus (see the reference numeral 10 in FIG. 1). A rate of changes in a degree of operation force of a vehicle door was determined after repeated 30 thousand (30,000) rotations or opening and closing operations of the vehicle. The check lever, of which rate of changes in the degree of operation force of a vehicle door is no greater than −30%, is found to meet characteristics demanded as a good product.

(Operation Force Against Moisture Absorption Test)

The produced check lever (see the reference numeral 11 in FIG. 1) is soaked in a hot liquid at 80° C. for 24 hours. Operation force of a door was measured in a condition where the polyamide resin composition associated with the sliding portion (see the reference numeral 14 in FIG. 1) has absorbed the liquid thereinto. The check lever, of which operation force of a door is no greater than 10 N•m, is found to meet characteristics demanded as a good product.

(Impact Strength Proof Test)

Figure 4:
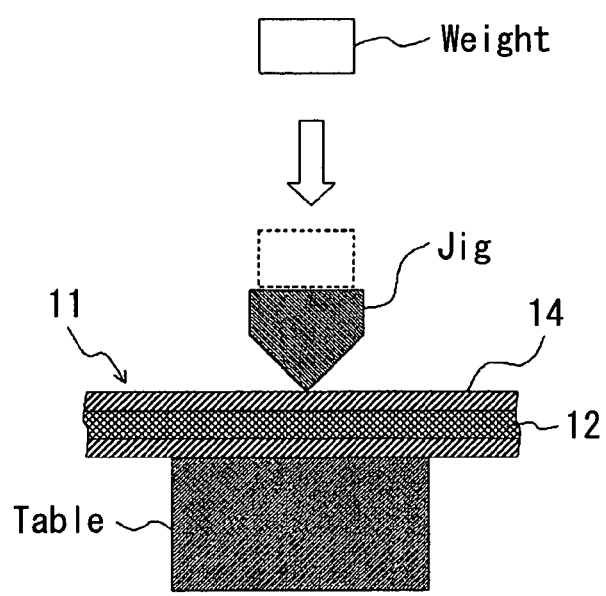
FIG. 4 is a view for explaining a abrasion resistance test.
Figure 5:
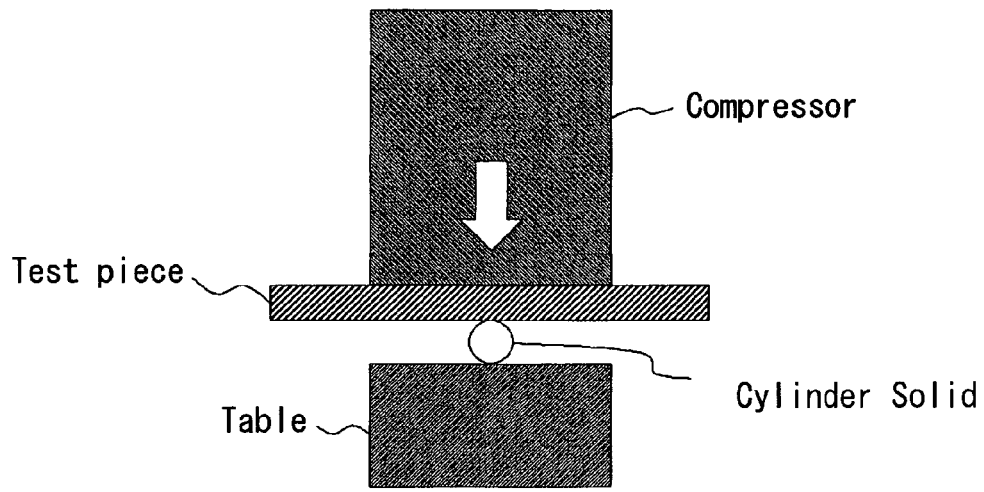
FIG. 5 is a view for explaining a method of measuring a compressing-distortion amount.

As is illustrated in FIG. 4, a jig, of which tip end is sharp, is positioned above the sliding portion of the check lever mounted on a stationary table. The tip end of the jig is in contact with the sliding portion. The presence or absence of cracks generated at the sliding potion of the check lever was measured when a certain weight drops towards the jig from a certain height. The check lever, at which no crack is generated in such a circumstance, is found to meet characteristics demanded as a good product.

The field of "cost" in Table 2 explains characteristics of each example on the basis of the cost 100 of the comparative example 3.

Next, the measured results for each example are evaluated as follow. As is explained in Tables 1 and 2, the comparative example 2, according to which the polyamide resin of the polyamide resin composition contains only nylon 6, exhibited excellent abrasion resistance and excellent impact strength. However, a degree of operation force when absorbing moisture was increased because the amount of liquid absorbed by the sliding portion is large, i.e., because an amount of distortion is large. The comparative example 1, according to which the polyamide resin of the polyamide resin composition contains only nylon 66, absorbed a less amount of liquid, so that a degree of operation force when absorbing moisture was preferably small. However, it exhibited deteriorated abrasion resistance and strength impact. The comparative example 3, according to which the polyamide resin of the polyamide resin composition contains only nylon 66 but includes Kevlar fibers as an additive, was found to meet characteristics demanded as a good product in terms of any of abrasion resistance, a degree of operation force against moisture absorption and impact strength. However, it exhibited a large manufacturing cost. Compared with these three comparative examples, the examples 1, 2 and 3, according to which the polyamide resin of the polyamide resin composition contains blended ingredients: Nylon 6 and Nylon 66, were found to meet conditions in terms of any of abrasion resistance, a degree of operation force when absorbing moisture, impact strength, and cost.

(Compressing-Distortion Proof Test)

Figure 6:
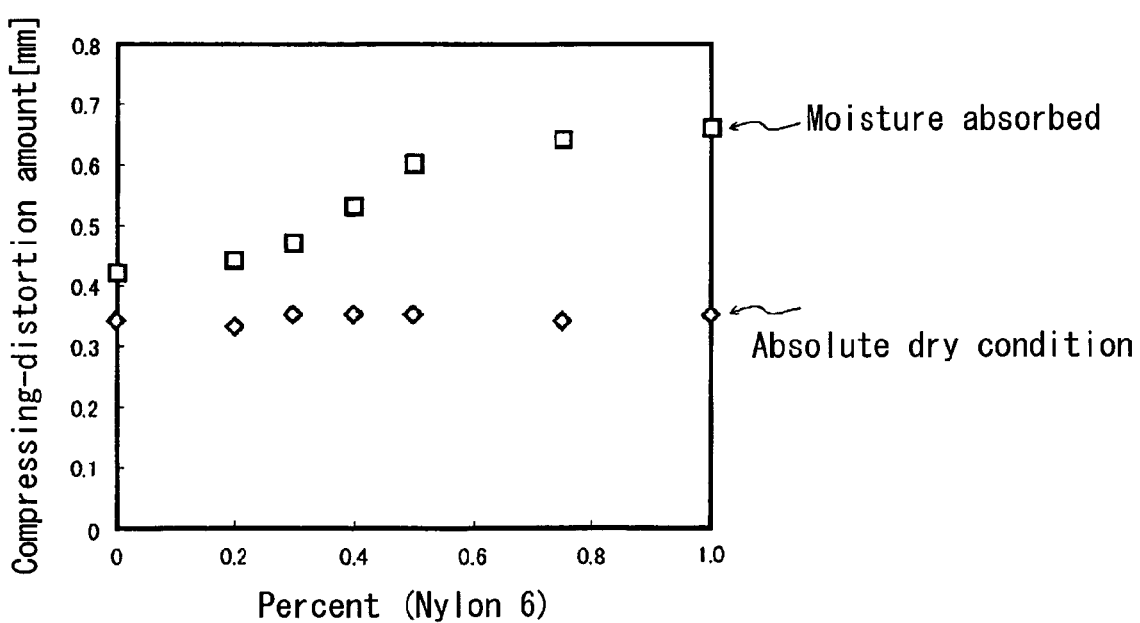
FIG. 6 is a diagram for explaining measured results of compressing-distortion amounts of polyamide resin compositions, which contain nylon 6 and nylon 66 at varied percentages in a polyamide resin.

Next, distortion amounts of the polyamide resin compositions, in which the polyamide resins respectively contains a combination of nylon 6 and nylon 66 at varied percentages, are evaluated. Test pieces, which contain nylon 6 and nylon 66 at varied percentages, are molded. A distortion amount of each test piece was measured (1) at a condition where it has been soaked for 24 hours at a hot liquid at 80° C. and has absorbed the liquid thereinto, and (2) at an absolute dry condition. As a method of measuring a distortion amount of each test piece, each test piece (10 mm-wide, 4 mm-thick) and a cylinder solid (6 mm-diameter). Each test piece is compressed with a weight (800 N-loading, 1 mm/min-load velocity). A diagram illustrated in FIG. 6 explains the test results.

Here, the polyamide resin composition contains (a) at 10 parts by weight of the wollastonite out of 100 parts by the total weight of the polyamide resin and the wollastonite; (b) at 5 parts by weight of the modified styrene copolymers based on 100 parts by the total weight of the polyamide resin and the wollastonite; and (c) at 2.5 parts by weight of the modified high-density polyethylene based on 100 parts by the total weight of the polyamide resin and the wollastonite.

As a result, irrespective of the combined percentage of nylon 6 and nylon 66, the test pieces at an absolute dry condition did not exhibit any differences in the distortion amounts due to compression. On the other hand, in regard to the test pieces which have absorbed liquid thereinto, the test pieces, which include nylon 6 at approaching amounts to 0 parts by weight, absorb less amounts of liquid thereinto. Therefore, the test piece containing nylon 6 at a less amount exhibits a less distortion amount against moisture absorption, and yet exhibits deteriorated abrasion resistance and impact strength. On the other hand, the test pieces, which include nylon 6 at approaching amounts to 100 parts by weight (i.e., include nylon 66 at approaching amounts to 0 parts by weight), absorb more amounts of liquid thereinto. Therefore, the test piece containing nylon 6 at a more amount exhibits a larger distortion amount against moisture absorption.

In the light of the foregoing, the polyamide resin, which contains at 10 to 50 parts by weight of nylon 6 and at 50 to 90 parts by weight of nylon 66, was found to exhibit well balanced characteristics in terms of compressing distortion amount, abrasion resistance, and impact strength. A preferable percentage of nylon 6 and nylon 66 is a combination of 10 to 40 parts by weight of nylon 6 and 60 to 90 parts by weight of nylon 66, more preferably a combination of 10 to 30 parts by weight of nylon 6 and 70 to 90 parts by weight of nylon 66.

As described above, according to the embodiment of the present invention, it is possible to meet conditions of any of form stability when absorbing moisture, abrasion resistance and to provide a lower manufacturing cost.

The principles, the preferred embodiment and mode of operation of the present invention have been described in the foregoing specification. However, the invention, which is intended to be protected, is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A sliding part using a polyamide resin composition at at least a sliding surface, the polyamide resin composition containing: 85 to 95 parts by weight of a polyamide resin; 5 to 15 parts by weight of a wollastonite; 3 to 10 parts by weight, to 100 parts by the total weight of the polyamide resin and the wollastonite, of a styrene copolymer modified with at least one modifier selected from a group consisting of unsaturated carboxylic acids and unsaturated dicarboxylic anhydrides; and 0.5 to 5 parts by weight, to 100 parts by the total weight of the polyamide resin and the wollastonite, of a high-density polyethylene modified with at least one modifier selected from the group consisting of the unsaturated carboxylic acids and the unsaturated dicarboxylic anhydrides, the high-density polyethylene having a weight-average molecular weight of 50,000 to 400,000, and the polyamide resin containing ingredients: 10 to 50 parts by weight of nylon 6 and 50 to 90 parts by weight of nylon 66, based on 100 parts by weight of the whole polyamide resin.

2. A vehicle door-checking apparatus comprising:
a check lever having a resin-made sliding portion integrally formed at a longitudinal directional center of a long-plate shaped insert;
a pair of sliding members interposing the sliding portion from both sides;
a pair of biasing means for biasing the pair of sliding members in directions opposing to each other;
a case having a through hole, into which the check lever is operatively inserted, the case housing the pair of sliding members, the pair of biasing means; and
the sliding portion comprising a polyamide resin composition containing: 85 to 95 parts by weight of a polyamide resin; 5 to 15 parts by weight of a wollastonite; 3 to 10 parts by weight, to 100 parts by the total weight of the polyamide resin and the wollastonite, of a styrene copolymer modified with at least one modifier selected from a group consisting of unsaturated carboxylic acids and unsaturated dicarboxylic anhydrides; and 0.5 to 5 parts by weight, to 100 parts by the total weight of the polyamide resin and the wollastonite, of a high-density polyethylene modified with at least one modifier selected from the group consisting of the unsaturated carboxylic acids and the unsaturated dicarboxylic anhydrides, and the polyamide resin containing ingredients: 10 to 50 parts by weight of a nylon 6 resin and 50 to 90 parts by weight of a nylon 66 resin, based on 100 parts by weight of the whole polyamide resin.

3. A vehicle door-checking apparatus according to claim 2, wherein the pair of sliding members are made of a polyathetal resin, in which high polymers having lubricity disperse.

4. A vehicle door check lever comprising:
a long-plate shaped insert operatively inserted into a through hole formed at a case of a vehicle door checking apparatus;
a sliding portion slidably interposed between a pair of sliding members biased, in directions opposing to each other, by a pair of biasing means which is housed in the case of the vehicle door checking apparatus, the sliding portion being integrally formed at a longitudinal directional central portion of the insert, and
the sliding portion comprising a polyamide resin composition containing: 85 to 95 parts by weight of a polyamide resin; 5 to 15 parts by weight of a wollastonite; 3 to 10 parts by weight, to 100 parts by the total weight of the polyamide resin and the wollastonite, of a styrene copolymer modified with at least one modifier selected from the group consisting of unsaturated carboxylic acids and unsaturated dicarboxylic anhydrides; and 0.5 to 5 parts by weight, to 100 parts by the total weight of the polyamide resin and the wollastonite, of a high-density polyethylene modified with at least one modifier selected from the group consisting of the unsaturated carboxylic acids and the unsaturated dicarboxylic anhydrides, and the polyamide resin containing ingredients: 10 to 50 parts by weight of a nylon 6 resin and 50 to 90 parts by weight of a nylon 66 resin, based on 100 parts by weight of the whole polyamide resin.

* * * * *